Figure 1:
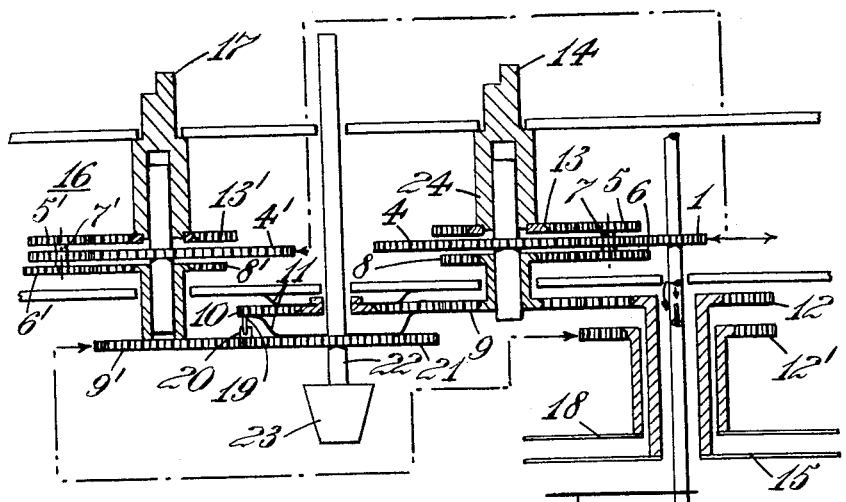

Dec. 26, 1961  T. BOWEN  3,014,375
CLOCK CONTROLLED MECHANISM
Filed Oct. 26, 1956  2 Sheets-Sheet 1

INVENTOR:
TOM BOWEN
BY: Moon & Hall
ATTORNEYS.

United States Patent Office 3,014,375
Patented Dec. 26, 1961

3,014,375
CLOCK CONTROLLED MECHANISM
Tom Bowen, London, England, assignor to S. Smith & Sons (England) Limited, London, England, a British company
Filed Oct. 26, 1956, Ser. No. 618,626
5 Claims. (Cl. 74—3.52)

This invention relates to a clock controlled mechanism for use between a power source and a device energized thereby and of the kind in which means are provided for adjusting both the time during which the power supply is operative and the time when it commences or ceases. The invention is particularly applicable to a clock controlled electric switch mechanism for electric cookers so as to enable the period of cooking time to be preset and also the time when the cooking is required to be completed.

According to this invention a clock controlled mechanism for use between a power source and a device to be energized thereby comprises means for actuating a cut-in device and means for actuating a cut-out device, a clockwork driven shaft arranged to actuate said devices respectively through two transmissions embodying adjustable differential gears, whereby the time at which the power supply may be cut in and cut out may be varied.

By a differential gear mechanism is meant a gear mechanism which permits two input rotations to be combined to give an output rotation which is the difference of multiples of the input rotations. For example, one form of differential gear mechanism is provided by an epicyclic gear having two coaxial sun wheels of different diameters cooperating with planet pinions which are of different diameters and which are mounted on a carrier co-axial with the sun wheels. Then if one sun wheel is rotated in accordance with one input, and the carrier is rotated in accordance with another input, the second sun wheel will be rotated in accordance with the differences of multiples of the input rotations, the multiples depending upon the relative diameters of the wheels and pinions.

A single adjusting member may be associated with the two adjustable differential gears in such a manner as to enable them to be independently adjusted.

The aforesaid two differential gears may either be entirely separate or may have an input member, which may be a common planet carrier.

In one construction according to the invention each adjustable differential gear comprises a planet wheel carrier driven by the clock, two coaxially arranged sun wheels associated with each carrier, the two sun wheels associated with one carrier engaging the same planet wheel or compound planet wheel one of which sun wheels is arranged to actuate said cut-in device and the other is adjustable, and the two sun wheels associated with the other carrier are likewise arranged to engage a planet wheel or compound planet wheel mounted on the carrier and one of which sun wheels is arranged to actuate said cut-out device while the other is adjustable.

The two adjustable sun wheels may be connected to an adjusting member through a transmission having a lost motion arrangement so as to permit the two sun wheels to be relatively rotated to required set positions.

An indicator may be associated with the two adjustable differential gears so as to show the time when cut out is to take place and the time period when the power supply is required to be active. For example the clockwork driven shaft may be arranged to rotate minutes and hour hands around a dial in a conventional manner and the two transmissions are arranged respectively to rotate pointers or discs relatively to the same dial.

In any of the arrangements referred to above, said cut-in and cut-out devices may comprise an electric switch mechanism arranged in the manner described in the specification of British patent specification No. 766,760.

Figure 3:
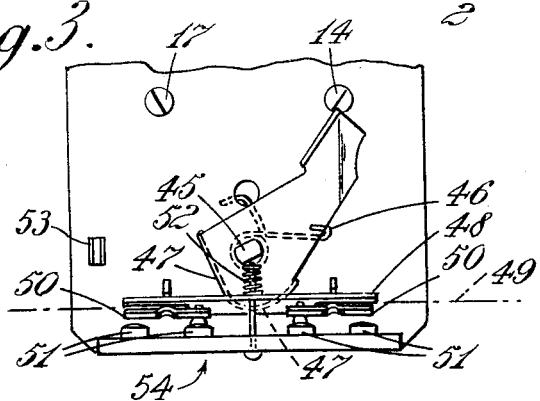
Figure 2:
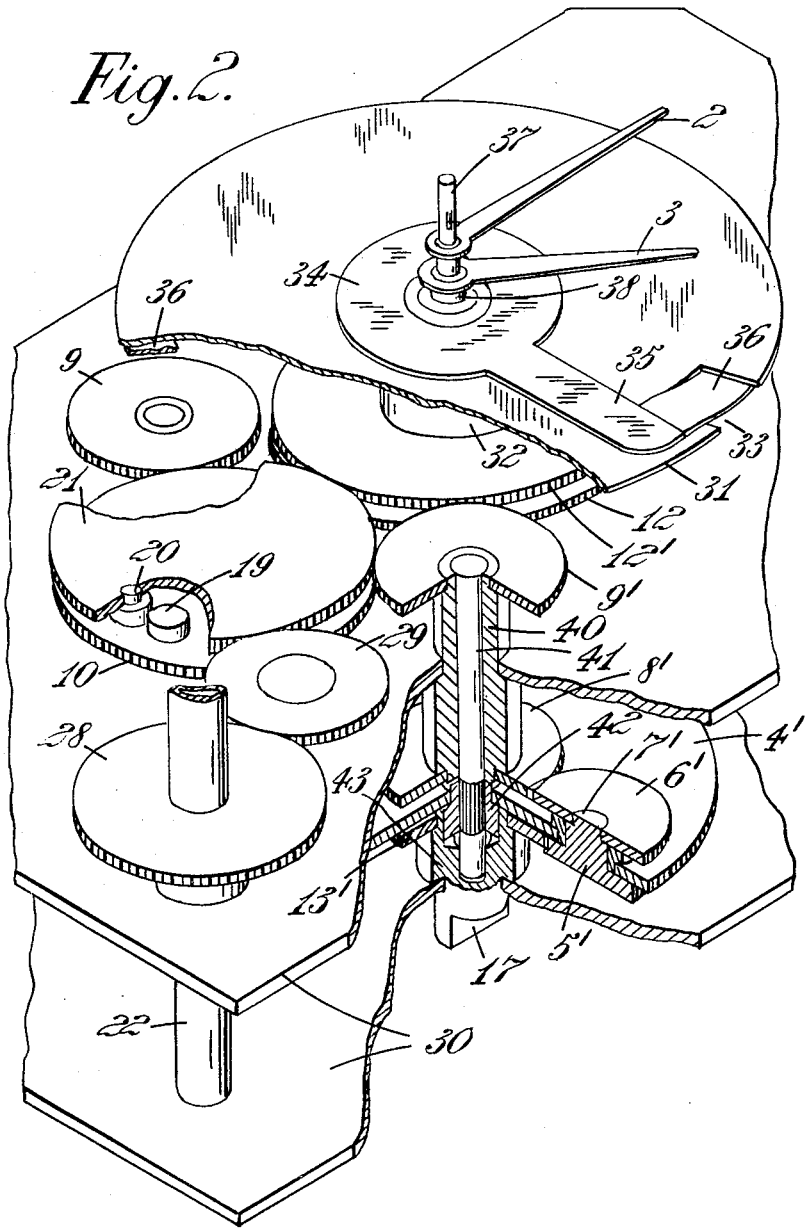

The following is a more detailed description of two alternative clock controlled electric switch mechanisms suitable for use with an electric cooker, reference being made to the accompanying drawings in which:

FIGURE 1 is a diagrammatic side elevation of the mechanism;

FIGURE 2 is a perspective view partly in section of the arrangement similar to that of FIGURE 1 but modified to show the positions which the parts assume in practice and embodying a different form of indicator, and FIGURE 3 is a diagrammatic plan view of a switch mechanism suitable for use with the assemblage shown in FIGURE 1 but with the rotatable adjustable stops 14 and 17 shown in different positions.

Like reference numerals refer to like parts in the various figures of the drawing.

Referring to the arrangement shown in FIGURE 1 a gear wheel 1 is driven from a synchronous electric motor through a transmission which is indicated by arrows and which also drives through conventional motion work (not shown but indicated also by arrows) the usual minute and hour hands 2 and 3. The gear wheel 1 also drives a gear wheel 4 which carries a pair of planet wheels 5 and 6 mounted on a short spindle 7 extending through it. The planet wheel 6 engages with a first sun wheel 8 which is carried upon the same shaft as a further wheel 9. The wheel 9 engages both with a wheel 10 which is normally frictionally locked against rotation by means of a suitable friction clutch washer 11 and also with a wheel 12. The wheel 5 engages with a second sun wheel 13 mounted upon a shaft 24 carrying an adjustable stop 14, concentric with the shafts carrying wheel 4 and wheel 8, but the wheels 4, 8 and 13 being all rotatable with respect to each other.

The wheel 4, planets 5 and 6, wheel 8 and wheel 13 constitute a differential gear, one input of which is provided by the wheel 1, the second input is provided by the wheel 10 via the wheel 9 while the shaft 24, which constitutes the output, positions the adjustable stop 14. The gear ratio of the wheels is such that, if the wheel 9 is kept stationary, the adjustable stop 14 rotates once in 12 hours (clockwise as viewed in FIGURE 3) and, if the wheel 1 is kept stationary and wheel 10 rotated, the wheel 12 and adjustable stop 14 rotate through equal angles.

The wheel 12 rotates a pointer or disc 15 moving over the same scale as minute and hours hands 2 and 3.

The rotatable adjustable stops 17, 14 are arranged to control the movement of a switch actuating unit 54 (see FIGURE 3) having a cam arm 44 which is fixed to a rotatable setting spindle 45. The arm is urged in an anti-clockwise direction by a spring 46. The arm is provided with a cam surface 47 which engages a plate 48 mounted to tilt about a horizontal axis 49 disposed to one side of the point of contact of the cam with the plate. The plate carries two bridging members 50 each arranged above a pair of contacts 51. In the position shown in FIGURE 3 the arm is retained at one end of its travel by the adjustable stop 14 and the plate has been tilted by the cam surface 47 against the action of a spring 52 so that the bridging members 50 are clear of the contacts. When the cam surface 47 releases the arm it swings over and under the action of the spring 46 into engagement with the adjustable stop 17 and the cam 47 allows the plate 48 to swing downwardly under the action of the spring 52, whereby the members 50 bridge the contacts 51. When the adjustable stop 17 releases the arm so that it engages the stop 53, the consequent further movement of the cam 47 again causes the bridging members 50 to be withdrawn from the contact.

A precisely similar mechanism, indicated generally at 16, positions a further adjustable stop 17 and a wheel 9' corresponding to the wheel 9 drives a wheel 12' through a transmission indicated by the arrows and chain line which wheel 12' drives a further hand or disc 18. Wheel 10 is provided with a projection 19 which is capable of engaging with a corresponding projection 20 on wheel 21 which bears the same relationship to the second mechanism as wheel 10 does to the first.

The adjustable stop 14 is positioned in accordance with the difference between a selected time indicated by the position of hand 15 and the actual time, and the mechanism is so arranged that when the actual and selected times are equal the adjustable stop 14 releases the switching mechanism to switch the cooker on. Similarly the adjustable stop 17 is so arranged that at the time indicated by hand 18 the cooker is switched off.

The wheel 21 is pinned on a shaft 22 positioned by a knob 23, so that the positions of hands 15 and 18 can be adjusted by appropriate manipulation of this knob by reason of the lost motion connection provided by the projections 19 and 20.

The arrangement shown in FIGURE 2 is very similar to that described above and like parts are marked with like reference numerals. However instead of the wheel 21 being fixed direct to the setting spindle 22 it is driven from the spindle 22 by wheels 28 and 29 the latter meshing with the wheel 21. Also the projection 20 of the previous arrangement is duplicated on the wheel 21 of FIGURE 2. In FIGURE 2 the means for frictionally braking the wheels 10 and 21 are not shown. The wheels 10 and 21 are in fact rotatably mounted on a spindle (not shown) which is fixed to the movement plates 30 and two friction washers are secured to this spindle and respectively engage the wheels 10 and 21.

Also, instead of the wheel 10 driving the wheel 12 through wheel 9, wheels 9 and 12 are both driven directly by the wheel 10 and similarly, instead of the wheel 21 driving the wheel 12' through the wheel 9' and through a transmission indicated by the chain line in FIGURE 1, wheels 9' and 12' are both driven directly by the wheel 21.

As will be seen, the wheels 8', 9' are fixed to a brush 40 which is rotatable on a spindle 41 fixed to the central boss 42 of gear wheel 4'. The wheel 13' is fixed to an enlarged portion 43 of the adjustable stop 17 which enlarged portion lies between the lower movement plate 30 and gear wheel 4'. The enlarged portion of the adjustable stop encircles a part of the boss 42 and the spindle 41.

Instead of the wheels 12 and 12' being connected to pointers as in the arrangement shown in FIGURE 1 the wheel 12' has secured to it a disc 31 by means of a hollow portion 32 and the edge of the disc has a radially extending slot 33 formed therein. Preferably the disc is black in color. The wheel 12 has fixed to it a hollow boss which extends up through the hollow boss 32 and has secured at its outer end an annulus 34 from which extends a radial arm 35. The radial arm 35 has secured to it one end of a split annulus 36 part of which extends through the slot and lies above the black disc and the other part lies below the disc. The split annulus may be white or appropriately colored to contrast with the black disc and its external diameter may be the same as that of the disc. Thus when there is relative rotation between the wheels 12—12' a greater or lesser amount of the split annulus will be visible above the black disc.

The minute and hour hands 2, 3 are fixed respectively to arbors 37 and 38 the latter being tubular and these two arbors pass down through the hollow hub portions of the wheels 12 and 12' and are driven in conventional manner from the same transmission which drives the wheels 4, 4'. A fixed annular clock scale (not shown) may be arranged around the black disc which latter is provided with a pointer which traverses the scale. The split annulus 36 may also be marked in hours and minutes, a pointer being provided at the zero end of the scale. With this arrangement the setting spindle 22 is rotated in such a direction that the stop 20 transmits movement to the stop 19 whereby both the wheels 10 and 21 move together thus rotating the wheels 12, 12' and the black disc 31 and split annulus 36 will move together until the pointer on the black disc is opposite the fixed time scale corresponding to the time when the switch is to be opened. The setting spindle 22 is then rotated in the opposite direction bringing the stop 20 away from the stop 19 and this will result in the wheel 12 being rotated alone. A part of the split annulus will therefore be drawn through the slot over the black disc until the scale on the split annulus indicates the time duration during which cooking is to take place, and the pointer on this split annulus will indicate against the fixed time scale when the switch is to close.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A clock controlled switch mechanism for use between an electrical power source and apparatus to be energized thereby comprising a switch arm, two adjustable rotatable stops respectively controlling switching-on and switching-off movements of the switch arm, actuating means for said stops comprising a gear member driven by a clock mechanism, a pair of epicyclic gear trains for transmitting a drive from the gear member to the two stops respectively, each gear train including a toothed planet carrier wheel meshing with said gear member, a pair of planetary gears journaled on the planet carrier wheel, a pair of sun gears arranged coaxially with the planet carrier wheel and respectively engaging the two planetary gears, one of the adjustable rotatable stops being coupled to a sun gear of one of the differential gear trains and the other adjustable rotatable stop being coupled to a sun gear of the other differential gear train, and means for adjusting the times at which the switching-on and switching-off movements are actuated comprising a single adjusting member and two transmissions connected to the other sun gears of the respective differential gear trains and driveable by the adjusting member, said adjusting means including means for permitting the sun gears to be adjusted separately one from the other.

2. A clock controlled switch mechanism for use between an electrical power source and apparatus to be energized thereby comprising a switch arm, two adjustable rotatable stops respectively controlling switching-on and switching-off movements of the switch arm, actuating means for said stops comprising a gear member driven by a clock mechanism, a pair of differential gear trains for transmitting a drive from the gear to the two stops respectively, each gear train including a toothed planet carrier wheel meshing with said gear member, a pair of planetary gears journaled on the planet carrier wheel, a pair of sun gears arranged coaxially with the planet carrier wheel and respectively engaging the two planetary gears, one of the adjustable rotatable stops being coupled to a sun gear of one of the differential gear trains and the other adjustable rotatable stop being coupled to a sun gear of the other differential gear train, and means for adjusting the times at which the switching-on and switching-off movements are actuated comprising a single adjusting member, connections between the adjusting member and the other sun gears of the differential gear trains, one of said connections including a lost motion connection whereby the sun gears can be adjusted separately one from the other.

3. A clock-controlled mechanism comprising a shaft driven by a clock mechanism, and first and second transmissions each of which has a differential gear mechanism and an element for actuating a control action; each of the said differential gear mechanisms comprising a planet wheel carrier drivingly connected to the said shaft, two planet wheels mounted on the planet carrier and two sun wheels mounted co-axially with the planet carrier, one of the said sun wheels meshing with one of the planet wheels and the other of the said sun wheels meshing with the other planet wheel, the two said planet wheels being operatively connected together, one of the said sun wheels being drivingly coupled to the said element of its respective transmission and the other said sun wheel being adjustable; and means associated with the two differential gear mechanisms for adjusting the two adjustable sun wheels whereby the times can be adjusted by which the control actions of the elements are respectively actuated by the other two sun wheels.

4. A clock-controlled mechanism comprising a shaft driven by a clock mechanism, and first and second transmissions each of which has a differential gear mechanism and an element for actuating a control action; each of which differential gear mechanisms comprises a planet wheel carrier drivingly connected to the said shaft, two planet wheels mounted on the planet carrier and two sun wheels mounted co-axially with the planet carrier, one of which sun wheels meshes with one of the planet wheels and the other of which sun wheels meshes with the other planet wheel of the respective differential gear mechanism, the two said planet wheels being operatively connected together, one of said sun wheels being drivingly coupled to said element of its respective transmission and the other said sun wheel being adjustable; and means for adjusting the two adjustable sun wheels comprising a single adjusting member connected to both of the adjustable sun wheels, said adjustable means comprising means for permitting one of the two said adjustable sun wheels to be driven by the adjusting member without the other said adjustable sun wheel being also driven by said adjusting member.

5. A clock-controlled mechanism comprising a shaft driven by a clock mechanism, and first and second transmissions each of which comprises a differential gear mechanism and an element for actuating a control action; each of which differential gear mechanisms comprises a planet wheel carrier drivingly connected to the said shaft, two planet wheels mounted on the planet carrier and two sun wheels mounted co-axially with the planet carrier, one of which sun wheels meshes with one of the planet wheels and the other of which sun wheels meshes with the other planet wheel, the two said planet wheels of each said differential gear mechanism being operatively connected together, one of the sun wheels being drivingly coupled to the said element of its respective transmission and the other said sun wheel being adjustable; and means for adjusting the two adjustable sun wheels comprising a single adjusting member, a connection between the adjusting member and each of the two said adjustable sun wheels, one of said connections including a lost motion connection whereby the said sun wheels can be adjusted separately one from the other.

References Cited in the file of this patent
UNITED STATES PATENTS

| | | |
|---|---|---|
| 1,611,063 | Peiler | Dec. 14, 1926 |
| 2,056,400 | Holtz | Oct. 6, 1936 |
| 2,200,110 | Andersen | May 7, 1940 |
| 2,312,077 | Cowles | Feb. 23, 1943 |
| 2,605,833 | Bliss | Aug. 5, 1952 |
| 2,631,664 | Poole | Mar. 17, 1953 |
| 2,689,005 | Schroeder | Sept. 14, 1954 |
| 2,825,401 | Kull | Mar. 4, 1958 |
| 2,903,058 | Larison | Sept. 8, 1959 |